United States Patent [19]

Verhenne et al.

[11] Patent Number: 5,633,817
[45] Date of Patent: May 27, 1997

[54] FAST FOURIER TRANSFORM DEDICATED PROCESSOR

[75] Inventors: Geert Verhenne, Desselgem; Peter Reusens, Laarne, both of Belgium

[73] Assignee: Alcatel N.V., Rijswijk, Netherlands

[21] Appl. No.: 552,916

[22] Filed: Nov. 3, 1995

[30] Foreign Application Priority Data

Nov. 7, 1994 [EP] European Pat. Off. ............. 94203235

[51] Int. Cl.$^6$ ................................................. G06F 15/00
[52] U.S. Cl. ................................................. 364/726
[58] Field of Search ................................. 364/725–726

[56] References Cited

U.S. PATENT DOCUMENTS

| | | |
|---|---|---|
| 3,638,004 | 1/1972 | Sloane et al. . |
| 4,117,541 | 9/1978 | Ali . |
| 4,164,021 | 8/1979 | Nishitani et al. . |
| 4,534,009 | 8/1985 | McGee ............................. 364/726 |
| 4,612,626 | 9/1986 | Marchant . |
| 4,970,674 | 11/1990 | White ............................. 364/726 |
| 5,163,017 | 11/1992 | Wong et al. ..................... 364/726 |
| 5,371,696 | 12/1994 | Sundararajan et al. ........... 364/726 |

FOREIGN PATENT DOCUMENTS 0459412   8/1993   European Pat. Off. .

OTHER PUBLICATIONS

IEEE Transactions on Acoustics, Speech and Signal Processing, Feb. 1988, USA, vol. 36, No. 2, ISSN 0096-3518, pp. 285-286—Duhamel P. et al "On computing the inverse DFT".

"Digital Filters: Analysis and Design" by Andreas Antoniou, published by McGraw Hill in 1979, pp. 369-379.

*Primary Examiner*—Tan V. Mai
*Attorney, Agent, or Firm*—Ware, Fressola, Van Der Sluys & Adolphson

[57] ABSTRACT

A Fast Fourier Transform (FFT) dedicated processor includes a scrambler SM scrambling a real input data sequence x(i) and thereby providing two scrambled data subsequences a(i) and b(i). A data generation circuit GC coupled to SM provides a complex data sequence y(i) whose real and imaginary parts equal the scrambled data subsequences a(i) and b(i) respectively. y(i) is applied to an arithmetic unit AU, which under the control of a control unit CoM, is successively converted to an arithmetic means AM, a data regeneration circuit RC and a combinatorial means CM. AM generates an intermediate Fast Fourier Transform series Y(i) of y(i). RC splits up Y(i) into Fast Fourier Transform series A(i) and B(i) of a(i) and b(i) respectively and CM executes a final traditional Fast Fourier Transform combinatorial step and produces the Fast Fourier Transform sequence X(i) of the real input data sequence x(i).

10 Claims, 2 Drawing Sheets

1

FAST FOURIER TRANSFORM DEDICATED PROCESSOR

TECHNICAL FIELD

The present invention relates to a Fast Fourier Transform dedicated processor, including a memory means to store an input data sequence, a scrambling means to scramble said input data sequence thereby generating a plurality of scrambled data subsequences, said scrambling means being coupled to an input of an arithmetic unit, generating a Fast Fourier Transform output sequence from said scrambled data subsequences.

BACKGROUND OF THE INVENTION

Such a processor is already known in the art, e.g. from the published European patent application EP 0459412, the scrambling means being referred to as an address generation circuit. In case of a real input data sequence this processor generates superfluous arithmetic results, because the second half of the Fast Fourier Transform output sequence generated is complex conjugated to the first half and may thus be derived therefrom. Thus, for such a real input data sequence, the processor in fact executes a number of unnecessary arithmetic operations and is therefore unnecessary complex. Moreover, the memory means must be quite large in order to store the Fast Fourier Transform output data sequence.

SUMMARY OF THE INVENTION

An object of the present invention is to provide a Fast Fourier Transform dedicated processor of the above known type, but wherein the number of arithmetic operations to be performed is reduced and its structure is simplified, without adversely affecting the storage capability of the memory means.

According to the invention, this object is achieved due to the fact that to process a real input data sequence, the processor additionally includes a data generation circuit which is connected between the scrambling means and the arithmetic unit and is adapted to derive from pairs of the scrambled data subsequences a complex data sequence, and that the arithmetic unit includes an arithmetic means, a data regeneration circuit and a combinatorial means, the arithmetic means being adapted to recursively execute Decimate In Time Fast Fourier Transform steps on said complex data sequence, thereby generating an intermediate Fast Fourier Transform series, the data regeneration circuit being adapted to generate from the intermediate Fast Fourier Transform series individual Fast Fourier Transform series of the pair of scrambled data subsequences, and the combinatorial means being adapted to execute a final Decimate In Time Fast Fourier Transform step on said individual Fast Fourier Transform series to thereby provide the Fast Fourier Transform output sequence.

In this way, by deriving the complex data sequence from the pair of scrambled data subsequences of e.g. length N/2 and by performing the Fast Fourier Transform on this complex data sequence, the number of arithmetic operations is considerably reduced, so that the processor can be simplified.

Additionally, by proceeding in the above way, the required storage capability of the memory means is not affected adversely as it has only to be able to store the output data sequence which is of length N/2. Although, it may seem that the required storage capability of the memory means could also remain unaffected by combining two consecutive real input data sequences each of length N/2 to obtain a real input data sequence of length N, this is not true because the result of a Fast Fourier Transform calculation of the real input data sequence of length N is a complex output data sequence of length N so that for storing this output data sequence of length N, the storage capability of the memory means must be doubled.

In the known processor delay effects are enlarged due to the fact that in case of a real input data sequence such a processor calculates a double Fast Fourier Transform output sequence.

It should be noted that compared with the known processor the use of the regeneration circuit implies an additional number of operations to be performed. However, as will be explained later, this regeneration circuit only executes add/subtract operations to derive the individual Fast Fourier Transform series from the intermediate Fast Fourier Transform series and therefore its presence in the subject processor does not increase the calculation time significantly.

Another characteristic feature of the present processor is that the arithmetic unit further includes a control unit adapted to selectively convert the arithmetic unit to the arithmetic means, the regeneration circuit and the combinatorial means, and also includes a data memory to successively store the complex data sequence and supply it as input data to said arithmetic means, store the intermediate Fast Fourier Transform series and supply it as input data to the regeneration circuit, and store the individual Fast Fourier Transform series and supply it as input data to the combinatorial means which finally stores the Fast Fourier Transform output sequence in the data memory.

In this way the same arithmetic unit is successively able to perform the functions of the arithmetic means, the regeneration circuit and the combinatorial means.

Another characteristic feature of the present processor is that the arithmetic unit includes first register means adapted to temporarily store real and imaginary parts of data elements of the input data and of weighing coefficients characteristic to Fast Fourier Transform calculations, second register means coupled to the first register means and adapted to temporarily store data, multiplier means adapted to multiply data stored in the second register means, a first add/subtract means coupled to the multiplier means and adapted to add/subtract output products of the multiplier means, a shuffling circuit adapted to shuffle and temporarily store intermediate results supplied to it, a second add/subtract means to inputs of which the intermediate results are applied, an output circuit which is coupled to the data memory and comprises the cascade connection of an ordering means and a scaling means to arrange and scale data applied to it and store it in the data memory, and selection means, controlled by the control unit to selectively perform the conversion of the arithmetic unit.

Yet another characteristic feature of the present processor is that the selection means under the control of the control unit are adapted to convert the arithmetic unit to the arithmetic means by coupling the second register means to the output circuit via the cascade connection of the multiplier means and the first add/subtract means when the Decimate In Time Fast Fourier Transform step is of a radix 2 type, and via the cascade connection of the multiplier means, the first add/subtract means, the shuffling circuit and the second add/subtract means when the Decimate In Time Fast Fourier Transform step is of a radix 4 type and that the selection means under the control of the control unit are adapted to convert the arithmetic unit to the combinatorial means by coupling the second register means to the output circuit via the cascade connection of the multiplier means, the first add/subtract means, the shuffling circuit and the second add/subtract means to execute the final Decimate In Time Fast Fourier Transform step of a radix 4 type.

Thus, under the control of the control unit the arithmetic unit may be easily adapted to perform either a radix 2 or a radix 4 Decimate In Time Fast Fourier Transform step.

Yet another characteristic feature of the present processor is that the selection means under the control of the control unit are adapted to convert the arithmetic unit to the regeneration circuit by coupling an input data storing part of the first register means to the output circuit via the cascade connection of the shuffling circuit and the second add/subtract means.

Thus the arithmetic unit executes the regeneration step by means of only the second add/subtract circuit, i.e. without use of the two multipliers and the first add/subtract circuit. It will be proved later that such an add/subtract operation is sufficient to split the intertwined individual Fast Fourier Transform series from the intermediate Fast Fourier Transform series.

Still another characteristic feature of the present processor is that the arithmetic unit moreover includes a weighing coefficient storage means storing the weighing coefficients, a data processing circuit coupled to the data memory and adapted to swap the real and imaginary parts of the data elements of the input data, and a weighing coefficient processing circuit coupled to the weighing coefficient storage means and adapted to swap and invert real and imaginary parts of the weighing coefficients stored in the storage means.

From e.g. p. 369–379 of the book 'Digital Filters: Analysis and Design' by Andreas Antoniou, published by McGraw Hill in 1979, it is known that weighing coefficients, characteristic to Fast Fourier Transform calculations, are characterized by a parameter $\alpha$, corresponding to an angle in a complex plane. By swapping and inverting real and imaginary parts of the weighing coefficients stored in the storage means, the coefficient processing circuit generates all weighing coefficients characterized by $\alpha$ values greater than 90° from weighing coefficients characterized by lower $\alpha$ values. A significant reduction of the required coefficient storage means is thus obtained.

A further characteristic of the present processor is that the data regeneration circuit generates the individual Fast Fourier Transform series from the intermediate Fast Fourier Transform series according to the formulas $2 A(i)=Y(i)+Y(2^N-i)^*$ and $2 B(i)=j Y(i)-j Y(2^N-i)^*$ wherein A(i) and B(i) are the individual Fast Fourier Transform series; Y(i) is the intermediate Fast Fourier Transform series; $2^N$ is the length of Y(i); $Y(2^N-i)^*$ is the complex conjugated number of $Y(2^N-i)$.

As will be described later, these equations are derived from the symmetry properties of the Fast Fourier Transform output data series of a real input data sequence.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein.

BEST MODE FOR CARRYING OUT THE INVENTION

Figure 1:
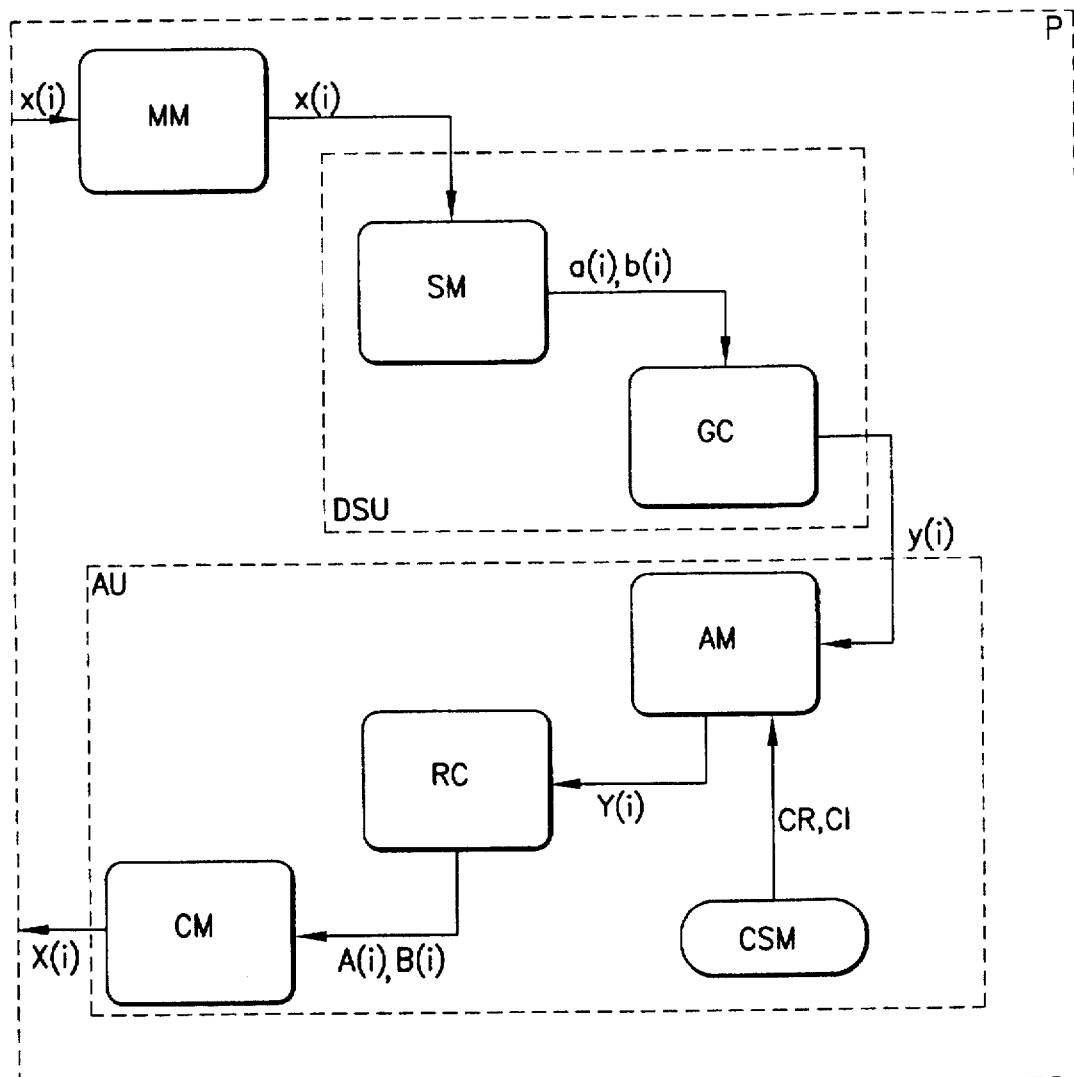
FIG. 1 is a functional block diagram of an embodiment of a Fast Fourier Transform dedicated processor P according to the invention.

The processor P shown in FIG. 1 is able to calculate a Fast Fourier Transform output sequence X(i) from an input data sequence x(i) of data elements. It includes a memory MM to store this input data sequence x(i) and a scrambler SM to scramble the thus stored input data sequence x(i) and to generate a scrambled data subsequence a(i) containing odd numbered input data elements x(2i+1), and a scrambled data subsequence b(i) containing even numbered input data elements x(2i). The scrambler SM scrambles the input data sequence x(i) and generates the scrambled data subsequences a(i) and b(i) to be able to execute the well-known radix 2 implementation of the Fast Fourier Transform algorithm.

The memory MM may store a complex data sequence as well as a real one. Although the processor P is primarily adapted to process a real input data sequence x(i) it can also be used to calculate the Fast Fourier Transform series of a complex input data sequence x(i). However, in the following, the processing of a real input data sequence x(i) is first considered.

As shown, the processor P additionally includes a data generation circuit GC to generate from the above two scrambled data subsequences a(i) and b(i) a complex data sequence y(i), the real and imaginary part of which are constituted by respective ones of these subsequences.

Because of the similarity between the operations to be executed by the scrambler SM and the data generation circuit GC, both can form part of e.g. a data sequencer unit DSU, as is indicated in FIG. 1.

The operation of the data generation circuit GC is based on the insight that for a real input data sequence x(i) half of the memory MM is filled with zeros because of the absence of imaginary parts. This normally empty half of MM could be filled with a second consecutive real input data sequence as a result of which it would become possible to compute a Fast Fourier Transform series of a real input data sequence of double length. However, and as already explained, the storage capability required to store the output data sequence X(i) would then be twice as large and delay effects may possibly occur.

To avoid such an increase of output storage capability, the two real data subsequences a(i) and b(i) are therefore treated by GC as the real part and the imaginary part of a complex data sequence y(i) respectively. GC stores these parts of y(i) in first and second halves of a memory DMM which forms part of an arithmetic unit AU.

The memory MM, the scrambler SM and the data generation circuit GC are not described in further detail, since from the above functional description their implementation is obvious to a person skilled in the art.

The latter arithmetic unit AU is able to perform a series of functions which are represented by the functional blocks or means AM, RC, CM, DMM and CSM. More particularly, AM is an arithmetic means, RC is a data regeneration circuit, CM is a combinatorial means, DMM is a data memory and CSM is a weighing coefficient storage means, these coefficients being used in Fast Fourier Transform calculations.

The arithmetic means AM calculates an intermediate Fast Fourier Transform series Y(i) from the complex data sequence y(i) applied to its input and stored in DMM.

As will be explained later, the data regeneration circuit RC, whose logic is based on the symmetry properties of the Fast Fourier Transform output sequence for a real input data sequence derives individual Fast Fourier Transform series A(i) and B(i) of the scrambled data subsequences a(i) and b(i) from the intermediate Fast Fourier Transform series Y(i) applied at its input.

Finally the combinatorial means CM executes the well known Decimate In Time Fast Fourier Transform step and thereby derives the Fast Fourier Transform output sequence X(i) of the input data sequence x(i) from the individual Fast Fourier Transform series A(i) and B(i) applied at its input.

In the following, mathematical calculations starting from the symmetry formulas of the Fast Fourier Transform series of a real data sequence are used to explain how the above generation of individual Fast Fourier Transform series A(i) and B(i) is obtained in the data regeneration circuit RC.

It is well known that due to symmetry properties of the Fast Fourier Transformation, symmetrically positioned data elements in the Fast Fourier Transform output sequence of a real input data sequence are complex conjugated.

Considering the two complex series A(i) and B(i), which are the individual Fast Fourier Transform series of the two real data subsequences a(i) and b(i) including $2^N$ data elements, the above mentioned symmetry properties imply that:

$$A(i)=A(2^N-i)^*, \text{ and}$$

$$B(i)=B(2^N-i)^*,$$

where $A(2^N-i)^*$ and $B(2^N-i)^*$ denote the complex conjugated numbers of $A(2^N-i)$ and $B(2^N-i)$.

On the other hand, considering the complex data sequence y(i) whose real and imaginary parts are equal to the two real data subsequences a(i) and b(i), i.e.

$$y(i)=a(i)+j\,b(i)$$

and taking into account the linearity properties of the Fast Fourier Transformation, Y(i) can be written as:

$$Y(i)=A(i)+j\,B(i) \quad (1)$$

where Y(i) is the intermediate Fast Fourier Transform series of the complex data sequence y(i).

Hence: $y(2^N-i)=A(2^N-i)+j\,B(2^N-i)$ and according to the above this implies that:

$$Y(2^N-i)=A(i)^*+j\,B(i)^*$$

$$\text{and: } Y(2^N-i)^* =A(i)-j\,B(i) \quad (2)$$

Combining equations (1) and (2) shows that it is possible to compute the two individual Fast Fourier Transform series A(i) and B(i) from the intermediate Fast Fourier Transform series Y(i). Indeed:

$$2\,A(i)=Y(i)+Y(2^N-i)^* \quad (3)$$

$$2\,B(i)=j\,Y(i)-j\,Y(2^N-i)^* \quad (4)$$

From the latter relations (3) and (4) it is clear that the data regeneration circuit RC may generate the individual Fast Fourier Transform series A(i) and B(i) from the intermediate results Y(i), some of them complex conjugated, by executing add/subtract operations only.

Figure 2:
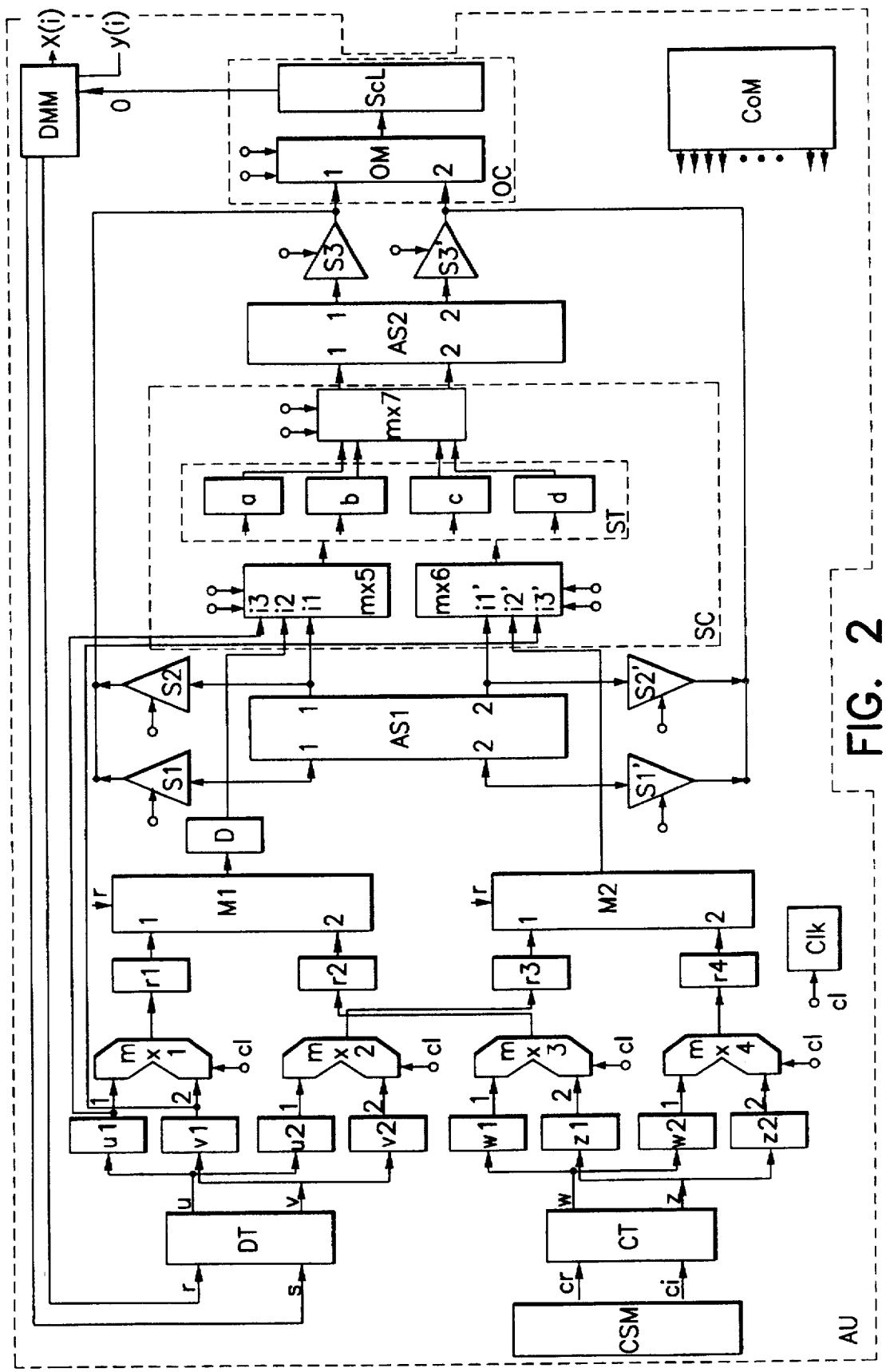
FIG. 2 is a detailed diagram of the arithmetic unit AU of FIG. 1.

Reference is now made to FIG. 2 which shows the arithmetic unit AU of FIG. 1 in detail. However, only DMM and CSM of FIG. 1 and not AM, RC and CM thereof are able to be distinguished in FIG. 2 because AU is able to perform a selected one of these functions AM, RC and CM by a suitable adaptation of its logic structure under the control of suitable control signals provided by a control unit CoM. This means that AU successively behaves as the functional blocks AM, RC and CM of FIG. 1.

As already mentioned, CSM stores weighing coefficients, characteristic to Fast Fourier Transform calculations, and DMM holds the data r and s to be processed.

A coefficient processing circuit CT, is connected to CSM to swap and invert the real and imaginary parts, cr and ci, of the stored weighing coefficients applied at its inputs, thereby generating the real and imaginary parts w and z of the weighing coefficients necessary for the processing operation.

In a similar way, the data processing circuit DT with outputs u, v is connected to the memory DMM to process the data r and s.

The weighing coefficients stored in CSM are complex exponentials $e^{j\alpha}$, characterized by a single parameter $\alpha$, the value of which corresponds to an angle in a complex plane. Real and imaginary parts of the weighing coefficients thus equal the cosine and sine respectively of the angle $\alpha$:

$$e^{j\alpha}=\cos(\alpha)+j\,\sin(\alpha)$$

Cosine and sine values of angles corresponding to a values greater than 90° can easily be obtained from the cosine and sine of angles in the first quadrant of the complex plane. Indeed, it suffices to replace a cosine by a sine or vice versa, with a possible sign change. These replacements and sign changes are executed by CT.

DT and CT are coupled to registers u1, u2, v1, v2, w1, w2, z1 and z2 in the following way: output u of DT is connected to registers u1 and u2 used to temporarily store the real parts of two successive first and second complex output data elements of DT respectively, and output v of DT is connected to registers v1 and v2, used to temporarily store the imaginary parts of these two first and second complex output data elements respectively. In a similar way, output w of CSM is connected to both the registers w1 and w2 to store therein the real parts of two successive first and second weighing coefficients respectively, whilst output z of CSM is connected to the registers z1 and z2 to store therein the imaginary parts of respective ones of these first and second weighing coefficients.

Furthermore, pairs of the above registers are connected to respective ones of four clock controlled multiplexers mx1, mx2, mx3, mx4, i.e. outputs of u1 and v1 are connected to respective inputs 1 and 2 of mx1 to enable mx1 to select either the real or the imaginary part of the first complex data element to be stored in a register r1 which is connected between mx1 and an input 1 of a multiplier M1. Mx3, to inputs 1 and 2 of which respective registers w1 and z1 are connected, is coupled to a second input 2 of M1 via a register r2. Outputs of u2 and v2 are connected to mx2 which selects either the real or imaginary part of the above second complex data element to be stored in a register r3 which couples mx2 to input 1 of a multiplier M2. Finally, register r4 couples mx4 to a second input 2 of M2, the inputs of mx4 being connected to w2 and z2 respectively.

The outputs of M1 and M2 are connected to respective inputs 1 and 2 of a first add/subtract circuit AS1.

It should be noted that in FIG. 2 a delay means D is additionally connected between M1 and AS1 because, compared with those of M2, the output products of M1 are earlier available.

Additionally, respective outputs 1 and 2 of AS1 are coupled to first inputs i1 and i1' of respective 3-input multiplexers mx5 and mx6 which both form part of a shuffling circuit SC. SC also includes a storage device ST and a multiplexer mx7. ST contains four registers a, b, c, and d to temporarily store intermediate results received from mx5 and mx6, and the multiplexer mx7 couples the registers a, b, c, and d to a second add/subtract circuit AS2. Therefore mx7 selects two of its inputs to be applied to respective inputs 1 and 2 of AS2.

To be able to apply data to an output circuit OC, comprising a cascade connection of an ordering means OM and a scaling means ScL, selection means S1 and S1' are coupled between the outputs of M1 and M2 and respective inputs 1 and 2 of OM, selection means S2 and S2' are coupled between outputs 1 and 2 of AS1 and respective inputs 1 and 2 of OM, and selection means S3 and S3' are coupled between outputs 1 and 2 of AS2 and respective inputs of OM.

Finally, ScL is connected to DMM to store the output data 0 of ScL.

Selection means S1, S1', S2, S2', S3, S3', multiplexers mx5, mx6, mx7 and ordering means OM are controlled by the above mentioned control unit CoM to enable AU to perform either a radix 2 Fast Fourier step, a radix 4 Fast Fourier step, a regeneration step, an initial add/subtract step necessary for inverse Fast Fourier Transform calculations, a special inverse step also used in inverse Fast Fourier Transform calculations or a complex multiplication.

As will become clear later, the outputs of M1 and u1 are therefore also connected to respective inputs i2 and i3 of mx5 whilst the outputs of M2 and v1 are coupled to respective inputs i2' and i3' of mx6.

It should be noted that for the sake of clarity of the drawing in FIG. 2 the connection lines between the control unit CoM and control inputs of several hardware components are not shown but are symbolically represented by two arrows, giving the direction of the control signal flow. Also the connection lines for clock signals are not shown in FIG. 2 but are symbolically represented by single arrows, denoted by c1.

In the following it is explained how AU is enabled to perform a selected one of the above steps.

Successively, it will be described how a radix 2 Decimate In Time Fast Fourier step (AM of FIG. 1), a radix 4 Decimate In Time Fast Fourier step, a regeneration step (RC of FIG. 1), a combinatorial step (CM of FIG. 1), an initial add/subtract step, a special inverse step and a complex multiplication are executed. Afterwards, it is explained how a complex input data sequence x(i) is treated by P.

Still considering a real input data sequence x(i), it is assumed that a radix 2 Decimate In Time Fast Fourier step has to be executed. In this case, the input data r and s are the real and imaginary parts of the complex data sequence y(i) stored in DMM and comprising the two scrambled data subsequences a(i) and b(i).

To perform the complex multiplication (u1.w1−v1.z1)+j (u1.z1+v1.w1) of a complex data element u1+j v1 and a complex weighing coefficient w1+j z1, four partial real multiplications are performed, i.e.: u1.w1, −v1.z1, u1.z1 and v1.w1. The negative sign in the factor −v1.z1 is provided by CT.

The data processing circuit DT swaps the real and imaginary parts r and s to generate u1 and v1 of a complex data element u1+j v1 and the coefficient processing circuit CT generates a complex weighing coefficient w1+j z1 from a weighing coefficient stored in CSM.

It should be noted that real and imaginary parts of the data and the weighing coefficient to be multiplied are temporarily stored in the registers u1, v1, w1 and z1. Clock controlled multiplexers mx1 and mx3 then temporarily store one of their inputs in respective output registers r1 and r2 in such a way that M1, which multiplies the data stored in r1 and r2, immediately generates the real part u1.w1−v1.z1 and the imaginary part u1.z1+v1.w1 of the above product. This implies that M1 multiplies u1 and w1, additionally multiplies v1 and −z1, and finally adds these two products. Therefore, M1 and M2 are no traditional multipliers which automatically perform a reset step after each multiplication. The output product of M1 or M2 is always added to its previous output product unless an external control signal is applied to its reset input r. In the latter case, a previous reset step is executed before the multiplier starts multiplying.

In a similar way, the second multiplier M2 generates the real part u2.w2−v2.z2 and the imaginary part u2.z2+v2.w2 of the product (u2+j v2)×(w2+j z2).

The products of M1 and M2 are applied to AS1, to complete the radix 2 Decimate In Time Fast Fourier step with an add/subtract operation.

Under the control of the control unit CoM and to output these radix 2 Fast Fourier results, S2 and S2' are activated whereas S1, S1', S3 and S3' are deactivated.

As a consequence, the output data of AS1 are thus passed through OM and ScL to obtain the arranged and scaled output result O which is the intermediate Fast Fourier Transform series Y(i). Y(i) is finally stored in DMM.

In case of a radix 4 Decimate In Time Fast Fourier step has to be executed, the scrambler SM of FIG. 1 has to generate four scrambled data subsequences instead of two, according to the remainder of the input data number, modulo 4. The data generation circuit GC of FIG. 1 then has to combine pairs of these subsequences in two complex data sequences, which are stored in the memory DMM of AU. To enable AU to perform a radix 4 Decimate In Time Fast Fourier step, S1, S1', S2 and S2' are deactivated whilst S3 and S3' are activated. To realize such a radix 4 step M1, M2 and AS1 are again used to perform radix 2 steps, but additionally the results of these radix 2 steps are applied to the add/subtract circuit AS2 to complete the radix 4 step. More particularly, on the basis of control signals received from CoM the multiplexers mx5 and mx6, included in SC, couple their respective first inputs i1 and i1' to ST so that the radix 2 Fast Fourier Transform results at the output of AS1 are temporarily stored in the registers a, b, c and d of ST. The multiplexer mx7 is then controlled by CoM in such a way that these radix 2 Fast Fourier results are applied to AS2 in pairs. Again, the output data 0, representing the radix 4 Fast Fourier output results, are arranged and scaled by OM and ScL respectively, before being stored in DMM.

Once the intermediate Fast Fourier Transform series Y(i) has been stored in DMM, AU has to be transformed in such a way that it is able to behave as the functional block RC of FIG. 1. AU is then able to derive A(i), B(i) from Y(i) which is applied to DT.

In FIG. 2, the input data r and s thus are the real and imaginary parts of Y(i), from which DT generates the complex conjugated and not-complex conjugated terms, Y(i) and $Y(2^N-i)^*$ respectively of the above equations (3) and (4).

As already mentioned and as follows from these equations, it suffices to add or subtract these terms to generate the individual Fast Fourier Transform series A(i) and B(i). Outputs of u1 and v1 are therefore connected to respective inputs i3 and i3' of mx5 and mx6 which under the control of CoM apply the above terms immediately to AS2 via ST and mx7. CoM moreover deactivates S1, S1', S2 and S2' and activates S3 and S3' so that A(i) and B(i) are therefore applied to OC and via the output O they are stored in DMM.

It is noted that it does not matter whether M1, M2 and AS1 are processing the data at their inputs or not since output results of M1, M2 and AS1 have no influence on the AU output sequence O because access from M1, M2 or AS1 to SC is blocked by mx5 and mx6. Also M1, M2 and AS1 are disconnected from OC due to S1, S1', S2 and S2' being deactivated.

AU is finally brought in a condition wherein it is able to perform a combinatorial step equal to that of the functional block CM in FIG. 1.

This combinatorial step is a final radix 4 Decimate In Time Fast Fourier Transform step and is executed as already described above for AM. However, because the input data are A(i), B(i), the output results O are now equal to the Fast Fourier Transform sequence X(i) of the input data sequence x(i).

Moreover, and again depending on the status of the selection means, the arithmetic unit AU can execute either a straightforward Fast Fourier Transform algorithm or an inverse Fast Fourier Transform algorithm. Indeed, an arithmetic operation sequence of a straightforward Fast Fourier Transform algorithm is schematically represented as:

$$lx+/-lx+/-l \ldots lx+/-l+/-lx+/-l$$
$$r2/r4r4 \quad r4 \quad r \quad fr4$$

where x represents a multiplication, ± represents an add/subtract operation, ┆ delimits successive steps, r2/r4 represents a radix 2 or radix 4 type Decimate In Time Fast Fourier Transform step, r4 represents a radix 4 type Decimate In Time Fast Fourier Transform step, r represents a regeneration step characterized by the above equations (3) and (4) and fr4 represents a combinatorial step or final radix 4 type Decimate In Time Fast Fourier Transform step. As is known, e.g. from the above mentioned book, an inverse Fast Fourier Transform algorithm includes an initial Decimate In Frequency Fast Fourier Transform step which must be executed before the inverse arithmetic operation sequence of the straightforward Fast Fourier Transform algorithm is executed.

Thus the arithmetic operation sequence of an inverse Fast Fourier Transform algorithm might be represented as:

$$l+/-xl+/-lx+/-l+/-xl \ldots lx+/-l$$
$$r2 \quad r \quad r2/r4r4 \quad r4$$

where r2 represents an initial radix 2 type Decimate In Frequency Fast Fourier Transform step, r represents a regeneration step characterized by the inverse equations (1) and (2) of (3) and (4), r2/r4 and r4 again represent the above mentioned respective radix 2 or radix 4 Decimate In Time and radix 4 Decimate In Time Fast Fourier Transform steps.

The above Decimate In Frequency Fast Fourier Transform step and Decimate In Time Fast Fourier Transform steps comprise a multiplication and an add/subtract operation. However, a Decimate In Time Fast Fourier Transform step starts with a multiplication followed by an add/subtract operation, whilst for a Decimate In Frequency Fast Fourier Transform step this sequence is inverted. Therefore, the above arithmetic unit AU, tuned for Decimate In Time Fast Fourier Transform steps, can also be used for Decimate In Frequency Fast Fourier Transform steps, by controlling the selection means in an appropriate way. Indeed, the arithmetic operation sequence of an inverse Fast Fourier Transform algorithm may be rewritten:

$$lx1+/-lx+/-lx+/-lx+/-l \ldots lx+/-l$$
$$ini \quad sp \quad r2/r4 \quad r4 \quad r4$$

where x1 represents a multiplication with a factor 1 and thus might be added, ini represents an initial add/subtract step for inverse Fast Fourier Transform calculations and sp represents a special inverse step for inverse Fast Fourier Transform calculations. As is seen, both the arithmetic operation sequences of a straightforward and an inverse Fast Fourier Transform algorithm are equal except for the initial steps.

To execute an initial add/subtract step for inverse Fast Fourier Transform calculations, the data r and s which represent the real and imaginary parts of the stored complex data elements X(i), are multiplied with a factor 1 by M1 and M2.

Additionally, the data are applied to AS1 which executes the add/subtract operation of the above initial Decimate In Frequency Fast Fourier step.

Output results of AS1 are applied to the output circuit OC by activating S2 and S2' whilst deactivating the other selection means.

To execute a special inverse step for inverse Fast Fourier Transform calculations, M1 and M2 multiply the data r and s with complex coefficients w and z which are generated by CT from the stored complex coefficients cr and ci. Furthermore, the data is not passed through AS1 because multiplexers mx5 and mx6 under the control of CoM connect their respective inputs i2 and i2' to ST.

The multiplexer mx7 applies the data elements stored in ST in pairs to AS2. The latter executes the add/subtract operation of the regeneration step r in the above arithmetic operation sequence for inverse Fast Fourier Transform calculations. CoM enables mx5 and mx6 to select their inputs i2 and i2', activates S3 and S3' and deactivates all other selection means.

The output data 0 are stored in DMM and may be used as an input data sequence for successive radix 2 or radix 4 Decimate In Time steps.

It is noted that AU also might perform a complex multiplication. Indeed, output results of M1 and M2 may immediately be applied to the output circuit OC by activating S1 and S1' and deactivating S2, S2', S3 and S3'. Output results O are again stored in DMM. In this way, AU also is enabled to perform a digital filter operation or window operation.

Finally, in case of a complex input data sequence x(i), the intermediate results Y(i) are passed transparently through the data regeneration circuit RC and the combinatorial means CM of FIG. 1, because they immediately represent the output Fast Fourier Transform sequence X(i). Thus, for a complex input data sequence x(i), the functional blocks AM, RC, and CM of FIG. 1 may be replaced by one single block in which radix 2 and radix 4 Fast Fourier steps are combined to generate X(i).

To should be noted that in case of a so called in place Fast Fourier Transform calculation, the memories DMM and MM of FIG. 1 may constitute a single memory.

A simple modification of the diagram shown in FIG. 2 however enables the arithmetic unit AU not to overwrite its input data sequence y(i). Therefore an additional memory, e.g. a supplementary RAM, should be connected to the arithmetic unit. This supplementary RAM is figured by DMM in FIG. 2.

Summarizing, the arithmetic unit AU generates either the intermediate Fast Fourier Transform series Y(i), the individual Fast Fourier Transform series A(i) and B(i) of a regeneration step or the output straightforward or inverse Fast Fourier Transform series X(i), depending on the control signals from the control means CoM.

While the principles of the invention have been described above in connection with specific apparatus, it is to be clearly understood that this description is made only by way of example and not as a limitation on the scope of the invention.

We claim:

1. A Fast Fourier Transform dedicated processor (P), including a memory means (MM) to store an input data sequence (x(i)), a scrambling means (SM) to scramble said input data sequence (x(i)) thereby generating a plurality of scrambled data subsequences (a(i), b(i)), said scrambling means (SM) being coupled to an input of an arithmetic unit (AU), generating a Fast Fourier Transform output sequence (X(i)) from said scrambled data subsequences (a(i), b(i)), characterized in that to process a real said input data sequence (x(i)) said processor (P) additionally includes a data generation circuit (GC) which is connected between said scrambling means (SM) and said arithmetic unit (AU) and is adapted to derive from pairs of said scrambled data subsequences (a(i), b(i)) a complex data sequence (y(i)), and that said arithmetic unit (AU) includes an arithmetic means (AM), a data regeneration circuit (RC) and a combinatorial means (CM), said arithmetic means (AM) being adapted to recursively execute Decimate In Time Fast Fourier Transform steps on said complex data sequence (y(i)) thereby generating an intermediate Fast Fourier Transform series (Y(i)), said data regeneration circuit (RC) being adapted to generate from said intermediate Fast Fourier Transform series (Y(i)) individual Fast Fourier Transform series (A(i), B(i)) of said pair of scrambled data subsequences (a(i), b(i)), and said combinatorial means (CM) being adapted to execute a final Decimate In Time Fast Fourier Transform step on said individual Fast Fourier Transform series (A(i), B(i)) to thereby provide said Fast Fourier Transform output sequence (X(i)).

2. A Fast Fourier Transform dedicated processor (P) according to claim 1, characterized in that said arithmetic unit (AU) further includes a control unit (CoM) adapted to selectively convert said arithmetic unit (AU) to said arithmetic means (AM), said regeneration circuit (RC) and said combinatorial means (CM), and also includes a data memory (DMM) to successively store said complex data sequence (y(i)) and supply it as input data to said arithmetic means (AM), store said intermediate Fast Fourier Transform series (Y(i)) and supply it as input data to said regeneration circuit (RC), and store said individual Fast Fourier Transform series (A(i), B(i)) and supply it as input data to said combinatorial means (CM) which finally stores said Fast Fourier Transform output sequence (X(i)) in said data memory (DMM).

3. A Fast Fourier Transform dedicated processor (P) according to claim 2, characterized in that said arithmetic unit (AU) includes first register means (u1, u2, v1, v2, w1, w2, z1, z2) adapted to temporarily store real and imaginary parts of data elements (u, v) of said input data and of weighing coefficients (w, z) characteristic to Fast Fourier Transform calculations, second register means (r1, r2, r3, r4) coupled to said first register means (u1, u2, v1, v2, w1, w2, z1, z2) and adapted to temporarily store data, multiplier means (M1, M2) adapted to multiply data stored in said second register means (r1, r2, r3, r4), a first add/subtract means (AS1) coupled to said multiplier means (M1, M2) and adapted to add/subtract output products of said multiplier means (M1, M2), a shuffling circuit (SC) adapted to shuffle and temporarily store intermediate results supplied to it, a second add/subtract means (AS2) to inputs of which said intermediate results are applied, an output circuit (OC) which is coupled to said data memory (DMM) and comprises the cascade connection of an ordering means (OM) and a scaling means (ScL) to arrange and scale data applied to it and store it in said data memory (DMM), and selection means (S1, S1', S2, S2', S3, S3', mx5, mx6), controlled by said control unit (CoM) to selectively perform said conversion of said arithmetic unit (AU).

4. A Fast Fourier Transform dedicated processor (P) according to claim 3, characterized in that said selection means (S1, Si', S2, S2', S3, S3', mx5, mx6) under the control of said control unit (CoM) are adapted to convert said arithmetic unit (AU) to said arithmetic means (AM) by coupling said second register means (r1, r2, r3, r4) to said output circuit (OC) via the cascade connection of said multiplier means (M1, M2) and said first add/subtract means (AS1) when said Decimate In Time Fast Fourier Transform step is of a radix 2 type, and via the cascade connection of said multiplier means (M1, M2), said first add/subtract means (AS1), said shuffling circuit (SC) and said second add/subtract means (AS2) when said Decimate In Time Fast Fourier Transform step is of a radix 4 type.

5. A Fast Fourier Transform dedicated processor (P) according to claim 3, characterized in that said selection means (S1, S1', S2, S2', S3, S3', mx5, mx6) under the control of said control unit (CoM) are adapted to convert said arithmetic unit (AU) to said regeneration circuit (RC) by coupling an input data storing part (u1, v1) of said first register means (u1, u2, v1, v2, w1, w2, z1, z2) to said output circuit (OC) via the cascade connection of said shuffling circuit (SC) and said second add/subtract means (AS2).

6. A Fast Fourier Transform dedicated processor (P) according to claim 3, characterized in that said selection means (S1, S1', S2, S2', S3, S3', mx5, mx6) under the control of said control unit (CoM) are adapted to convert said arithmetic unit (AU) to said combinatorial means (CM) by coupling said second register means (r1, r2, r3, r4) to said output circuit (OC) via the cascade connection of said multiplier means (M1, M2), said first add/subtract means (AS1), said shuffling circuit (SC) and said second add/subtract means (AS2) to execute said final Decimate In Time Fast Fourier Transform step of a radix 4 type.

7. A Fast Fourier Transform dedicated processor (P) according to claim 3, characterized in that said arithmetic unit (AU) moreover includes a weighing coefficient storage means (CSM) storing said weighing coefficients, a data processing circuit (DT) coupled to said data memory (DMM) and adapted to swap said real (r) and imaginary (s) parts of said data elements of said input data, and a weighing coefficient processing circuit (CT) coupled to said weighing coefficient storage means (CSM) and adapted to swap and invert real (cr) and imaginary (ci) parts of said weighing coefficients stored in said storage means (CSM).

8. A Fast Fourier Transform dedicated processor (P) according to claim 3, characterized in that said selection means (S1, S1', S2, S2', S3, S3', mx5, mx6) under the control of said control means (CoM) are adapted to bring said arithmetic unit (AU) in a condition where it is adapted to execute an initial add/subtract step for inverse Fast Fourier Transform calculations by coupling said second register means (r1, r2, r3, r4) to the output circuit (OC) via said cascade connection of said multiplier mean (M1, M2) which perform a factor 1 multiplication and said first add/subtract means (AS1), and that the selection means (S1, S1', S2, S2', S3, S3', mx5, mx6) under said control of said control means (CoM) are adapted to bring said arithmetic unit (AU) in a further condition where it is adapted to execute a special inverse step for inverse Fast Fourier Transform calculations by coupling said second register means (r1, r2, r3, r4) to said output circuit (OC) via the cascade connection of said multiplier means (M1, M2), said shuffling circuit (SC) and the second add/subtract means (AS2), and that said selection means (S1, S1', S2, S2', S3, S3', mx5, mx6) are adapted to bring said arithmetic unit (AU) in a further condition where it is adapted to execute a complex multiplication by coupling said second register means (r1, r2, r3, r4) to said output circuit (OC) via said multiplier means (M1, M2).

9. A Fast Fourier Transform dedicated processor (P) according to claim 1, characterized in that said complex data sequence (y(i)) has a real and an imaginary part equal to respective ones of said pair of scrambled data subsequences (a(i), b(i)).

10. A Fast Fourier Transform dedicated processor (P) according to claim 1, characterized in that said data regeneration circuit (RC) generates said individual Fast Fourier Transform series (A(i), B(i)) from said intermediate Fast Fourier Transform series (Y(i)) according to said formulas $2 A(i)=Y(i)+Y(2^N-i)^\sim$ and $2 B(i)=j Y(i)-j Y(2^N-i)^\sim$ wherein A(i) and B(i) are said individual Fast Fourier Transform series; Y(i) is the intermediate Fast Fourier Transform series; $2^N$ is said length of Y(i); $Y(2^N-i)^\sim$ is said complex conjugated number of $Y(2^N-i)$.

* * * * *

UNITED STATES PATENT AND TRADEMARK OFFICE
CERTIFICATE OF CORRECTION

PATENT NO. : 5,633,817
DATED : May 27, 1997
INVENTOR(S) : Geert Verhenne
Peter Reusens It is certified that error appears in the above-identified patent and that said Letters Patent is hereby corrected as shown below:

In Column 12, line 10, line 3 of Claim 4, "Si'" should be --S1'--

In Column 12, line 60, line 8 of Claim 8, "the" should be --said--

In Column 12, line 64, line 12 of Claim 8, "said" should be --the--

Signed and Sealed this

Seventh Day of October, 1997

Attest:

BRUCE LEHMAN

Attesting Officer     Commissioner of Patents and Trademarks